Patented Feb. 9, 1937

2,070,240

UNITED STATES PATENT OFFICE 2,070,240

THERAPEUTIC COMPOUND

Samuel Ruben, New Rochelle, N. Y.

No Drawing. Application May 9, 1936, Serial No. 78,855

15 Claims. (Cl. 167—65)

This invention relates to therapeutic compounds.

An object of the invention is the provision of a water soluble compound formed from a base of acetyl salicylic acid, which is useful in various therapeutic applications.

Other objects will be apparent from the disclosure.

The invention comprises the therapeutic compound formed by the reaction at high temperatures of acetyl salicylic acid with a glycol such as propylene, ethylene or di-ethylene glycol. The material produced is a glycol ester of acetyl salicylic acid.

This application is a continuation in part of my co-pending application Serial Number 53,524, filed December 9, 1935, for Therapeutic compound.

As is well known, acetyl salicylic acid is but very slightly soluble in water. However, I have found that by the expedient of heating the compound with a glycol to a sufficiently high temperature, a new, clear compound, water soluble in all proportions, is obtained, having new and improved therapeutic characteristics over the pure acetyl salicylic acid.

The material of my invention has been found to be highly and rapidly effective as a sedative, an analgesic, antiseptic and, in some proportions, as a hypnotic. A fundamental factor of importance is that the product resulting from the heating of the two materials to an adequate temperature is water soluble, and it is this characteristic which produces the more effective results.

A mixture of acetyl salicylic acid and glycol as such will not have an appreciably greater solubility in water than the dry acetyl salicylic acid but I have found, if the acetyl salicylic acid is heated with a glycol, that a clear solution is obtained at 80° C. However, upon cooling, precipitation of acetyl salicylic acid crystals occurs with only a negligible amount remaining in solution. Further, if the hot 80° C. clear solution be mixed with water, instantaneous crystal precipitation takes place. It is only when the two materials are heated to a temperature beyond the solution temperature, that a permanent solution or compound is formed which will not precipitate crystals on standing and which will be completely water soluble.

I have found that the required temperature varies with the concentration of the reacting agent. For instance, with one part of acetyl salicylic acid and eighteen parts of propylene glycol, a temperature of 120° C. appears to be adequate. With one part acetyl salicylic acid and nine parts propylene glycol, a temperature of 140° C. appears necessary to provide a stable solution; and with one part of acetyl salicylic acid and 4.5 parts of propylene glycol, 150° C. seems to be the minimum temperature necessary to provide and maintain a stable solution. At temperatures below those stated, crystals of relatively water insoluble material are formed.

It appears that propylene glycol—acetyl salicylate is formed by the reaction between the acetyl salicylic acid and the propylene glycol at the temperatures stated. The product has a probable empirical formula of $C_{12}H_{14}O_5$, the reaction apparently being as follows:

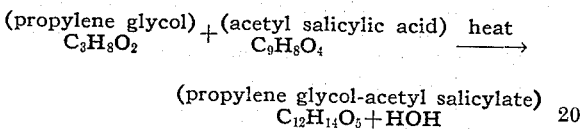

Where ethylene glycol is used, it is believed ethylene glycol acetyl salicylate is formed, the probable empirical formula being $C_{11}H_{12}O_5$.

As indicated, the completed product in each case, contains an excess of glycol.

The compound formed from reacting one part of acetyl salicylic acid with nine parts propylene glycol at a temperature of 140° C. has been found to have the most useful general application. Used orally, a small quantity is dissolved in water; externally, as a nose or throat spray, it may be used undiluted and for such purposes has been found to have a definite emolient germicidal and analgesic action. For other applications, as on wounds, it may be either instilled or applied with brush or tampon.

From animal experimentation, it appears that propylene glycol acetyl salicylate is about forty percent less toxic than the corresponding ethylene compound. With white mice, the mean fatal dose, for propylene glycol acetyl salicylate, given intra-peritoneally, is 0.1 c. c. of the 1:9 solution per 15 gram mouse and 0.06 c. c. of ethylene glycol acetyl salicylate for the same weight.

With rabbits, intraveneous injections, in the order of 0.2 c. c. per kg. weight, have been given, without systemic effects. The material, as thus administered, acted as a hypnotic and produced sleep within a few minutes without much change in respiration or muscular reaction. These observations are cited mainly to illustrate the properties of the new compound which distinguish from the properties of either glycol or acetyl salicyclic acid.

A series of laboratory experiments with cultures of the various pyogenic organisms and with typhoid bacilli, showed that the material exerted a definite antiseptic and germicidal effect as compared with phenol. This is illustrated specifically by the following test results:

| | Dilution | Min. of exp. to germicide | | | Remarks |
|---|---|---|---|---|---|
| | | 5 | 10 | 15 | |
| Compound product of 1 part acetyl salicylic acid—9 parts propylene glycol 140° C. | 1:25 | − | − | − | *Staphylococcus aureus* (D. C.) temp. 37° C. |
| | 1:40 | − | − | − | |
| | 1:50 | − | − | − | |
| | 1:75 | + | + | + | |
| Phenol | 1:80 | − | − | − | 5 c. c. unfiltered culture to 5. c. c. diluted germicide. Subculture incubated 48 hrs. 37° C. |
| | 1:90 | + | + | − | |
| | 1:100 | + | + | + | |

Solutions, compounded from a higher acetyl salicylic acid percentage, show a greater bactericidal effect.

When used as an antiseptic, the material possesses a number of advantages, for example, it is non-irritating, non-corrosive, emollient, analgesic and will maintain its bactericidal action for a longer period than most available antiseptics. Its effect is not dependent upon a volatile carrier, such as water, acetone or alcohol; it does not evaporate nor leave an ineffective residue.

Of some interest is the lack of similarity in the materials produced when glycerine is substituted for glycol. When acetyl salicylic acid and glycerine are heated to the temperatures specified above, a material of higher viscosity, which, upon cooling and standing, deposits water insoluble crystals, is obtained.

I claim:

1. A therapeutic material comprising the water soluble reaction product resulting from heating acetyl salicylic acid and a glycol to a point from which no crystals are precipitated when the material cools.

2. A therapeutic material comprising the reaction product resulting from heating acetyl salicylic acid and a glycol to a temperature in the order of 120° C.

3. A therapeutic material comprising the reaction product resulting from heating acetyl salicylic acid and a glycol to a temperature in the order of 140° C.

4. A therapeutic material comprising the reaction product resulting from heating acetyl salicylic acid and a glycol to a temperature in the order of 150° C.

5. A therapeutic material comprising the reaction product resulting from heating acetyl salicylic acid and propylene glycol to a temperature in the order of from 120° C. to 150° C.

6. A therapeutic compound comprising a water soluble glycol acetyl salicylate.

7. A therapeutic compound comprising water soluble propylene glycol acetyl salicylate.

8. A therapeutic compound comprising water soluble ethylene glycol acetyl salicylate.

9. The method of preparing a stable therapeutic compound which comprises heating acetyl salicylic acid and a glycol to a temperature sufficient to form a clear solution, which, upon cooling to normal atmospheric temperature, will not precipitate crystals.

10. The method of preparing a therapeutic compound which comprises heating acetyl salicylic acid with a glycol to a temperature sufficient to react the materials to a point where the reaction product will not precipitate crystals upon return to normal temperatures.

11. The method of preparing a stable therapeutic compound which comprises heating acetyl salicylic acid and propylene glycol to a temperature sufficient to form a clear solution, which, upon cooling to normal atmospheric temperature, will not precipitate crystals.

12. The method of preparing a therapeutic compound which comprises heating acetyl salicylic acid and a glycol to a temperature in the order of 120° C.

13. The method of preparing a therapeutic compound which comprises heating acetyl salicylic acid and a glycol to a temperature in the order of 140° C.

14. The method of preparing a therapeutic compound which comprises heating acetyl salicylic acid and a glycol to a temperature in the order of 150° C.

15. The method of preparing a therapeutic compound which comprises heating propylene glycol and acetyl salicylic acid to a temperature in the order of from 120° C. to 150° C.

SAMUEL RUBEN.